(12) United States Patent
Nakazawa

(10) Patent No.: US 10,224,791 B2
(45) Date of Patent: Mar. 5, 2019

(54) ELECTRIC MOTOR AND MACHINE TOOL EQUIPPED WITH THE ELECTRIC MOTOR

(71) Applicant: FANUC CORPORATION, Yamanashi (JP)

(72) Inventor: Yasuyuki Nakazawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 141 days.

(21) Appl. No.: 15/628,240

(22) Filed: Jun. 20, 2017

(65) Prior Publication Data

US 2017/0373572 A1 Dec. 28, 2017

(30) Foreign Application Priority Data

Jun. 24, 2016 (JP) ................................. 2016-125445

(51) Int. Cl.
*H02K 15/16* (2006.01)
*H02K 15/14* (2006.01)
(Continued)

(52) U.S. Cl.
CPC ............. *H02K 15/165* (2013.01); *H02K 5/20* (2013.01); *H02K 5/225* (2013.01); *H02K 7/04* (2013.01);
(Continued)

(58) Field of Classification Search
CPC ............ H02K 5/20; H02K 5/225; H02K 7/04; H02K 15/14; H02K 15/165; H02K 2205/09
See application file for complete search history.

(56) References Cited

U.S. PATENT DOCUMENTS 3,535,567 A * 10/1970 Boyson ................ H02K 11/042
                                                310/68 R
5,235,228 A * 8/1993 Nakanura ............... F16F 15/30
                                                310/168
(Continued)

FOREIGN PATENT DOCUMENTS

JP          S56-008894 U        1/1981
JP          S60-069301 U        5/1985
(Continued)

OTHER PUBLICATIONS

An Office Action mailed by the Japanese Patent Office dated May 8, 2018, which corresponds to Japanese Patent Application No. 2016-125445 and is related to U.S. Appl. No. 15/628,240.

*Primary Examiner* — David J Bolduc
(74) *Attorney, Agent, or Firm* — Studebaker & Brackett PC

(57) ABSTRACT

To provide an electric motor enabling easy and high-precision balance correction even after operating over a long period, and a machine toll including this electric motor. An electric motor includes: a cylindrical stator; a rotor having a rotary shaft part inserted inside of the stator; a housing installed to both ends in an axial direction of the stator; a terminal box that is mounted to the housing and accommodates a terminal block; an opening provided so as to open within the terminal box through the housing, and disposed to be separated from a ventilation passage formed in the stator; and a first balance correction component that is installed to the rotary shaft part, and corrects balance of the rotor, in which the first balance correction component is exposed within the terminal box from the opening; and a machine tool includes this electric motor.

6 Claims, 11 Drawing Sheets

(51) Int. Cl.
*H02K 5/20* (2006.01)
*H02K 5/22* (2006.01)
*H02K 7/04* (2006.01)

(52) U.S. Cl.
CPC ......... *H02K 15/14* (2013.01); *H02K 2205/09* (2013.01)

(56) References Cited

U.S. PATENT DOCUMENTS

| | | | | |
|---|---|---|---|---|
| 5,554,900 | A * | 9/1996 | Pop, Sr. | H02K 1/2773 310/156.61 |
| 5,780,946 | A * | 7/1998 | Nakamura | F04D 25/082 310/58 |
| 6,005,318 | A * | 12/1999 | Pop, Sr. | H02K 1/2773 29/598 |
| 6,259,180 | B1 * | 7/2001 | Pop, Sr. | H02K 1/2773 29/598 |
| 2006/0125333 | A1 * | 6/2006 | Wehner | H02K 5/20 310/54 |
| 2009/0151450 | A1 * | 6/2009 | Angantyr | H02K 7/04 73/487 |
| 2010/0181873 | A1 * | 7/2010 | Kern | B22C 7/026 310/418 |
| 2011/0109176 | A1 * | 5/2011 | Yoshimura | H02K 5/20 310/64 |
| 2012/0146435 | A1 * | 6/2012 | Bott | H02K 5/20 310/43 |
| 2012/0267988 | A1 * | 10/2012 | Hassel | G01D 11/24 310/68 B |
| 2013/0300230 | A1 * | 11/2013 | Nakazawa | H02K 5/10 310/63 |
| 2014/0239757 | A1 * | 8/2014 | Gray | H02K 5/161 310/58 |
| 2014/0361643 | A1 * | 12/2014 | Kamiya | H02K 5/08 310/43 |
| 2014/0373658 | A1 * | 12/2014 | Tamaki | F16H 57/039 74/425 |
| 2016/0181886 | A1 * | 6/2016 | Larsson | H02K 5/15 310/71 |
| 2017/0012487 | A1 * | 1/2017 | Brandl | H02K 1/185 |

FOREIGN PATENT DOCUMENTS

| | | |
|---|---|---|
| JP | H02-060456 A | 2/1990 |
| JP | 2716237 B2 | 2/1998 |
| JP | 2004-204748 A | 7/2004 |
| JP | 4787351 B2 | 10/2011 |
| JP | 2013-158114 A | 8/2013 |
| JP | 2015-223022 A | 12/2015 |
| JP | 2016-082629 A | 5/2016 |

\* cited by examiner

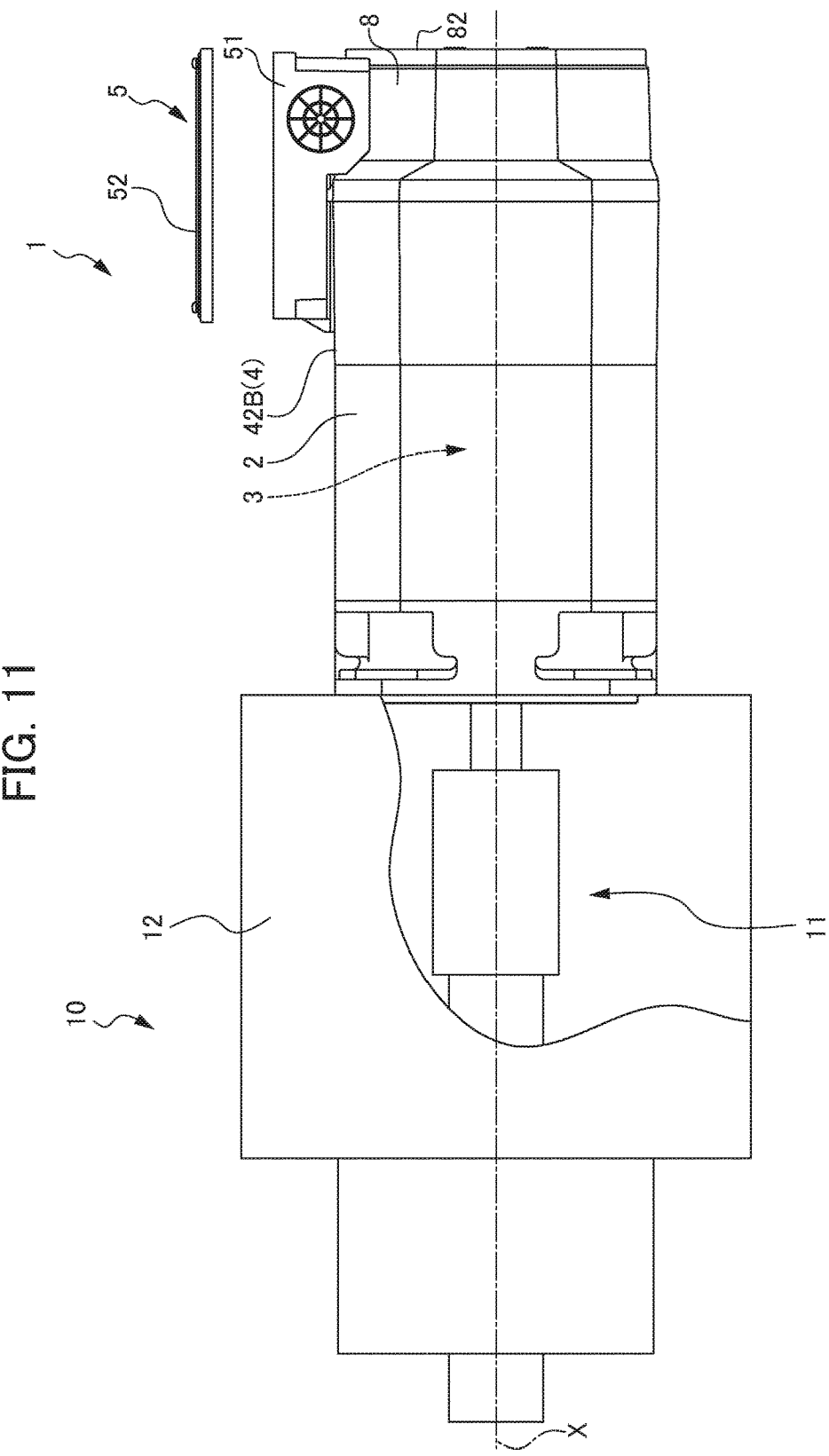

ELECTRIC MOTOR AND MACHINE TOOL EQUIPPED WITH THE ELECTRIC MOTOR

This application is based on and claims the benefit of priority from Japanese Patent Application No. 2016-125445, filed on 24 Jun. 2016, the content of which is incorporated herein by reference.

BACKGROUND OF THE INVENTION

Field of the Invention

The present invention relates to an electric motor with a terminal box having a balance structure, and a machine tool equipped with this electric motor.

Related Art

In recent years, increases in the revolution speed of the spindle of machine tools has progressed, and to match this, increases in the revolution speed increase of the electric motor coupled to the spindle has also progressed. In electric motors rotating at high speed, it is necessary to balance correct the rotor with high precision so that vibrations do not become excessive during high-speed rotation. For this reason, electric motors having various balance structures have been proposed (for example, refer to Patent Documents 1 and 2).

Patent Document 1: Japanese Patent No. 2716237
Patent Document 2: Japanese Patent No. 4787351

SUMMARY OF THE INVENTION

However, balance correction of the rotor is usually performed prior to assembly of the electric motor. Additionally, balance correcting (field balance) the rotor is important even after assembly of the electric motor or after coupling with the spindle. Furthermore, it is important to make re-correction of balance such as in the case of the vibration gradually worsening in an electric motor that operates for a long term.

To address this, with the electric motor of Patent Document 1, a labyrinth structure with a tap for balance correction is provided to a front part of the electric motor, and since this rebalance structure is exposed to the outside of the electric motor, balance correction becomes possible by installing a set screw or the like in the tap from the outside. However, when coupling an electric motor to the spindle or the like of a machine tool, since the labyrinth structure will be arranged within the spindle head, balance correction has not been possible after coupling due to the above-mentioned labyrinth structure with a tap for balance correction.

In addition, with the electric motor of Patent Document 2, a tap for balance correction is provided to a heat dissipating disk provided to the back part of the electric motor, and balance correction becomes possible by installing a set screw of the like. However, a cooling fan or the like is mounted to the back part of the electric motor, and thus the tap for balance correction provided to a heat dissipating disk is not exposed to outside of the electric motor. For this reason, balance correction has not been possible without removing and disassembling the cooling fan, etc.

To address this, recently, a structure capable of balance correction without dismantling the electric motor by way of exposing the component for balance correction to outside from an opening provided in the housing of the electric motor has also been proposed. However, with such a structure, although the initial balance correction is not a problem, balance correction by the balance correction component may become difficult, from debris such as cutting oil and contamination penetrating the opening and accumulating upon being used.

The present invention has been made taking account of the above, and the object thereof is to provide an electric motor enabling easy and high-precision balance correction even after operating over a long period, and a machine tool equipped with this electric motor.

In order to achieve the above-mentioned objects, a first aspect of the present invention provides an electric motor (for example, the electric motor 1 described later) including: a cylindrical stator (for example, the stator 2 described later); a rotor (for example, the rotor 3 described later) having a rotary shaft part (for example the rotary shaft part 31 described later) inserted inside of the stator; a housing (for example, the housing 4, front housing 41, back housing 42 described later) installed to both ends in an axial direction of the stator; a terminal box (for example, the terminal box 5 described later) mounted to the housing and accommodating a terminal block (for example, the terminal block 50 described later); an opening (for example, the opening 5*a* described later) provided so as to open within the terminal box through the housing, and disposed to be separated from a ventilation passage (for example, the ventilation passage 9 described later) formed in the stator; and a balance correction component (for example, the first balance correction component, 61, second balance correction component 62 described as the balance correction component 6 described later) that is installed to the rotary shaft part, and corrects balance of the rotor, in which the balance correction component is exposed within the terminal box from the opening.

According to a second aspect of the present invention, in the electric motor as described in the first aspect, the balance correction component may include, at an outer peripheral lateral face (for example, the outer peripheral lateral faces 61*b*, 62*b* described later) thereof, a balance correction part (for example, the second taps 612, 622 described later) which enables balance correction of the rotor.

According to a third aspect of the present invention, in the electric motor as described in the first or second aspect, the balance correction component may include, at an end face (for example, the axial direction end faces 61*a*, 62*a* described later) in an axial direction thereof, a balance correction part (for example, the first taps 611, 621 described later) which enables balance correction of the rotor.

According to a fourth aspect of the present invention, in the electric motor as described in any one of the first to third aspects, the balance correction component may be configured to be integrated with a detection rotating element that detects a revolution speed of the rotor.

According to a fifth aspect of the present invention, in the electric motor as described in any one of the first to fourth aspects, the opening may be disposed to be separated from an internal space (for example, the internal space S described later) of the stator.

In addition, a sixth aspect of the present invention provides a machine tool (for example, the machine tool 10 described later) including each of the electric motors as described in any one of the first to fifth aspects.

According to the present invention, it is possible to provide an electric motor enabling easy and high-precision balance correction even after operating over a long period, and a machine tool equipped with this electric motor.

BRIEF DESCRIPTION OF THE DRAWINGS

FIG. 11 is a partial sectional side view when coupling the electric motor according to the present embodiment to the spindle of a machine tool.

DETAILED DESCRIPTION OF THE INVENTION

Hereinafter, embodiments of the present invention will be explained in detail while referencing the drawings.

Figure 1:
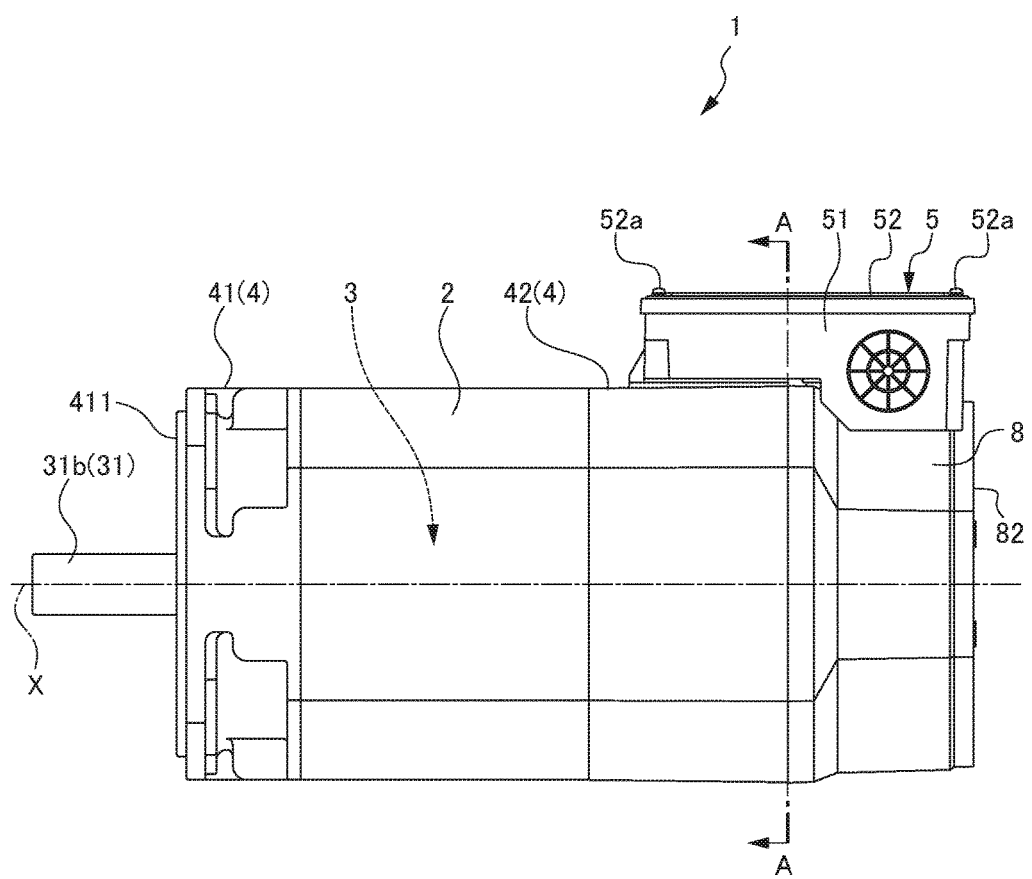
FIG. 1 is a side view of an electric motor according to the present embodiment.
Figure 2:
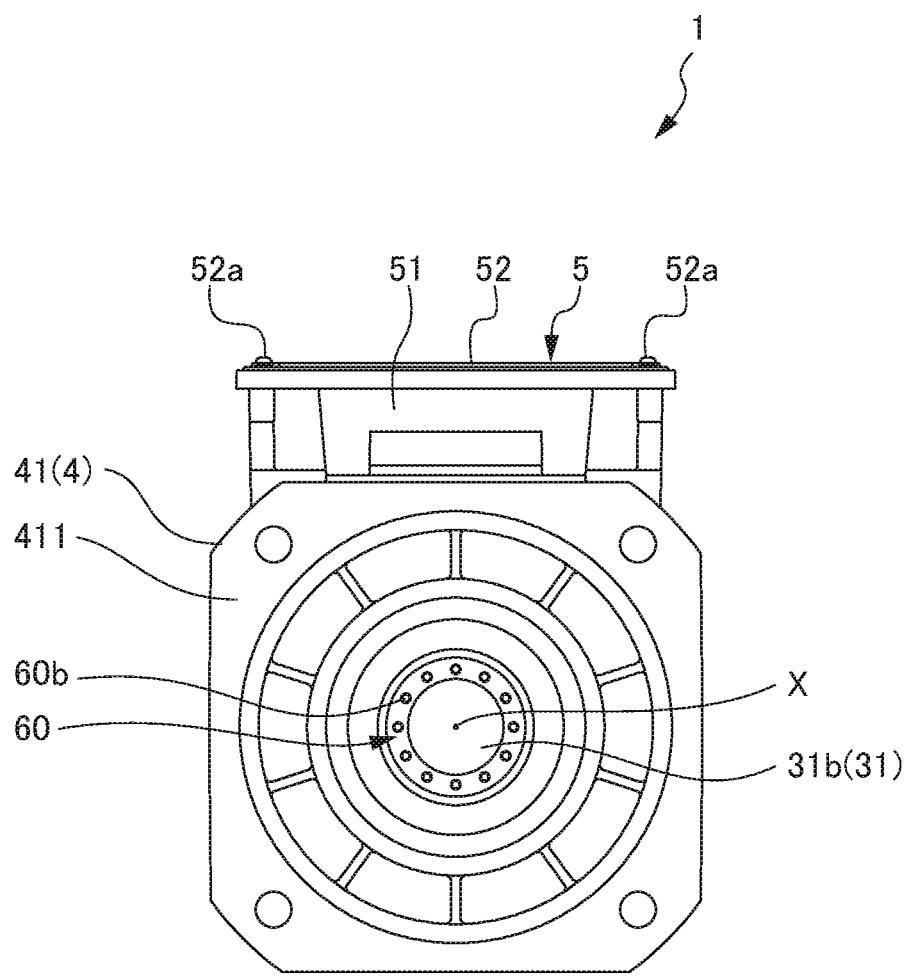
FIG. 2 is a drawing viewing the electric motor according to the present embodiment from forward in the axial direction.
Figure 3:
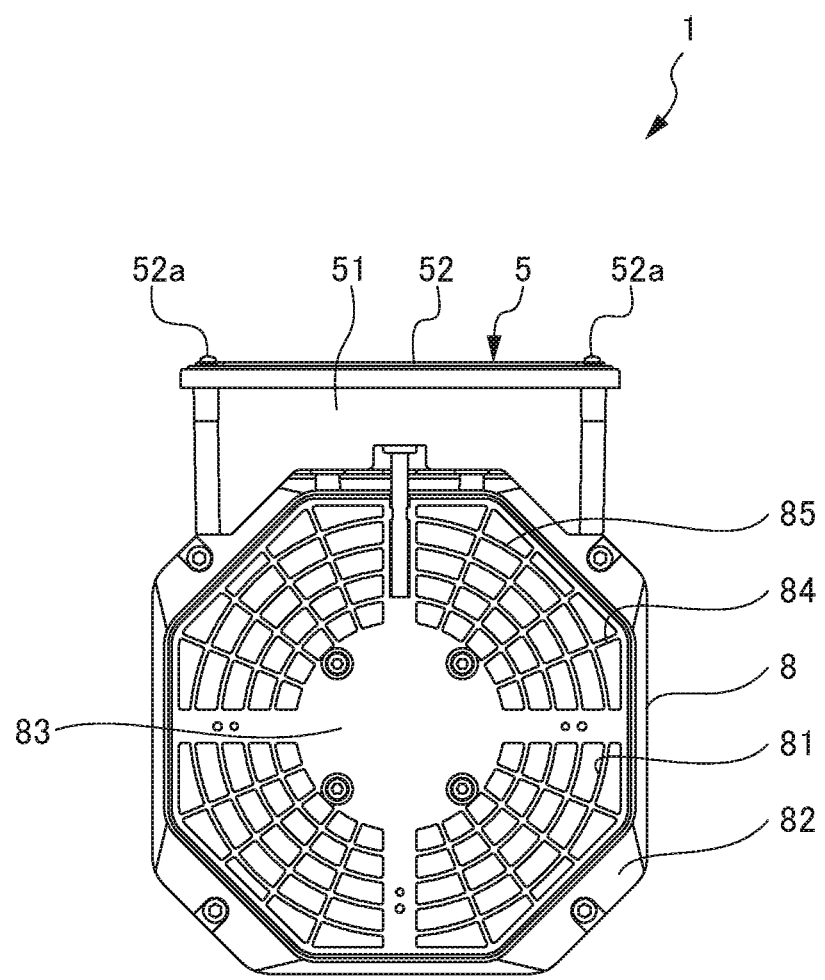
FIG. 3 is a drawing viewing the electric motor according to the present embodiment from rearward in the axial direction.
Figure 4:
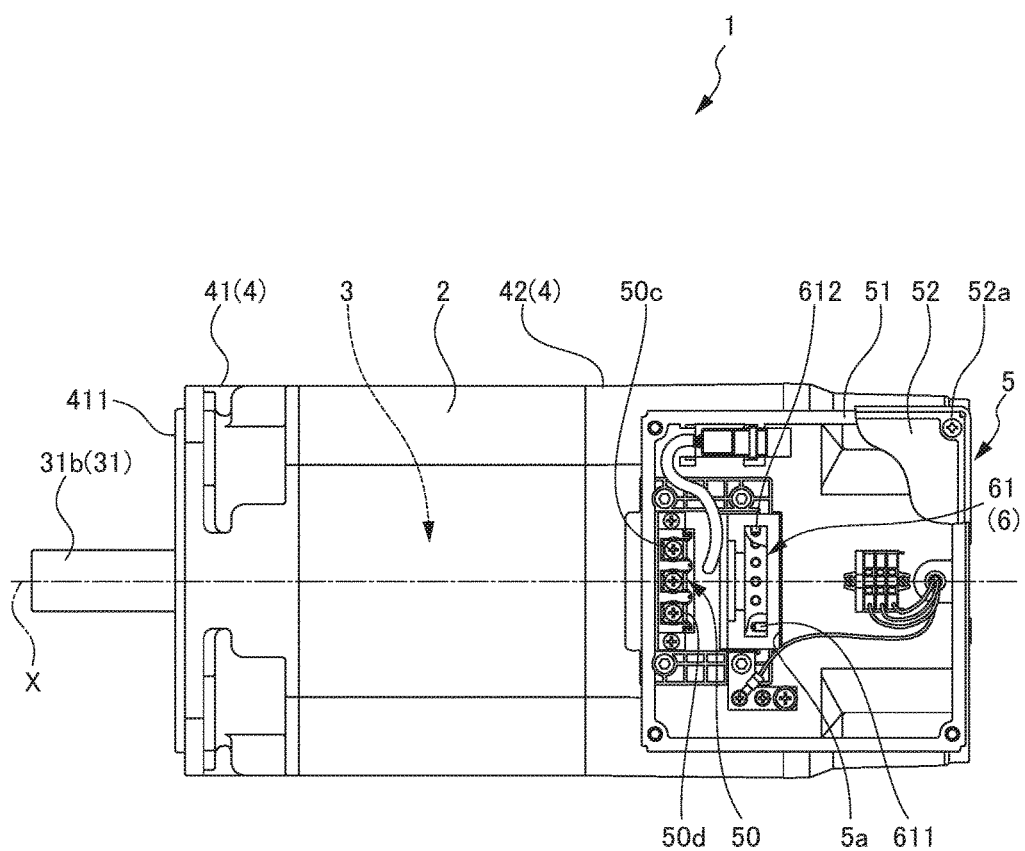
FIG. 4 is a plan view of the electric motor according to the present embodiment.
Figure 5:
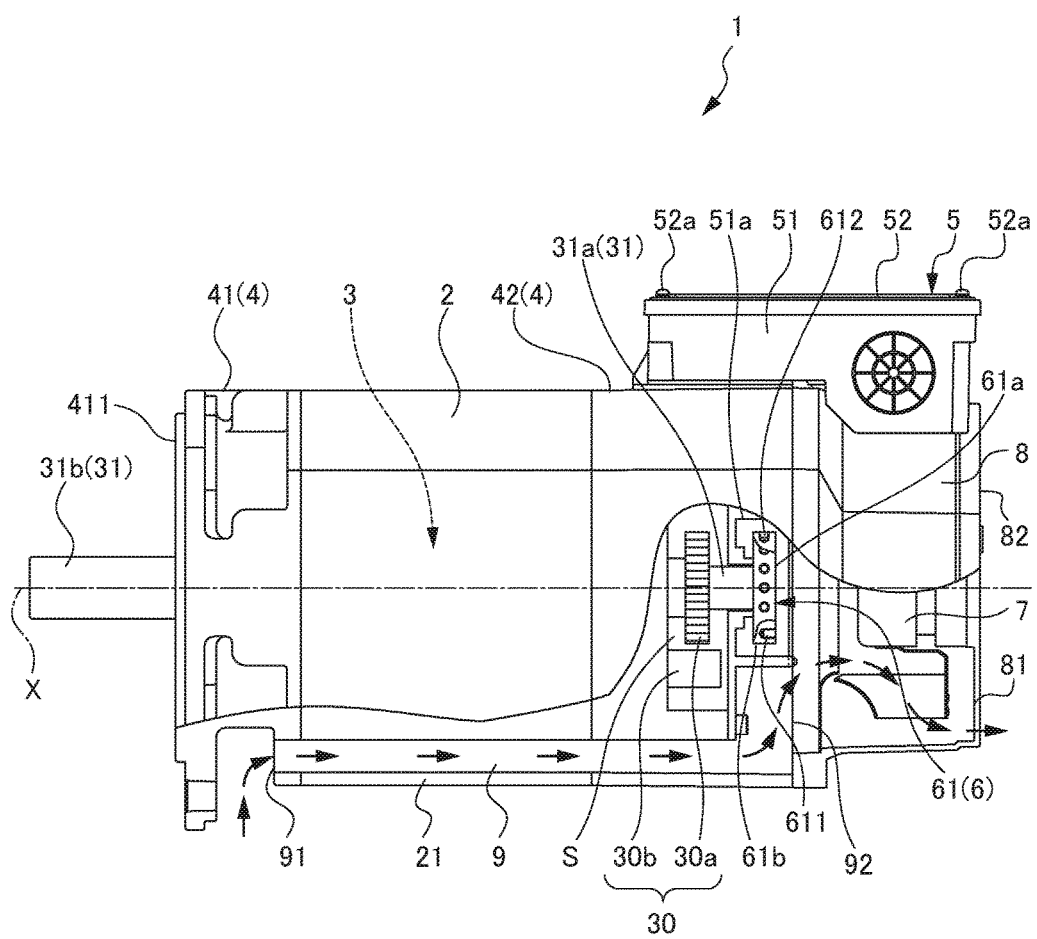
FIG. 5 is a partial cross-sectional view of FIG. 1.
Figure 6:
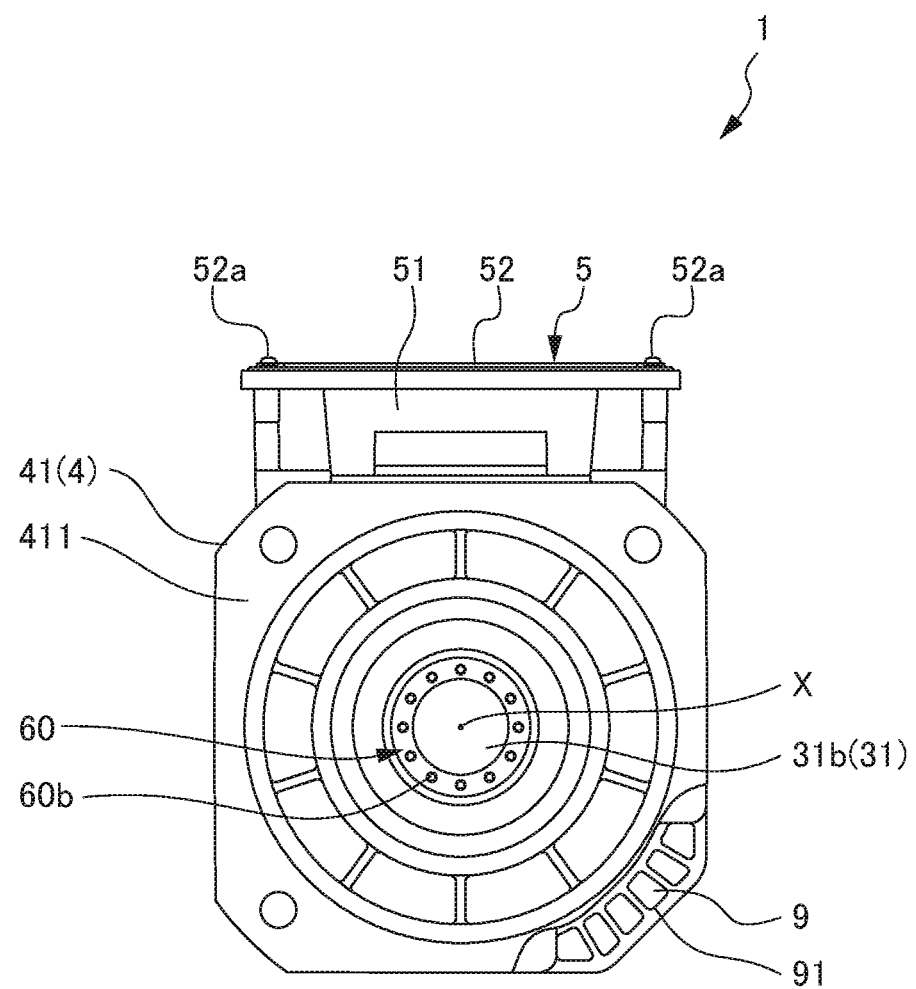
FIG. 6 is a partial cross-sectional view of FIG. 2.
Figure 7:
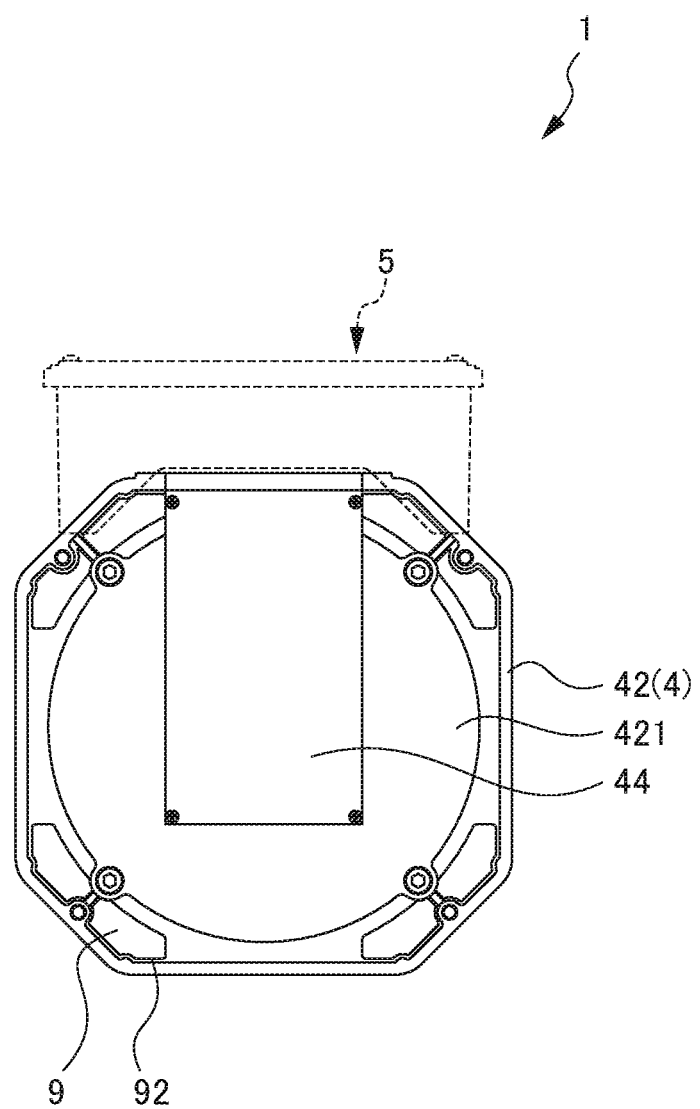
FIG. 7 is a cross-sectional view along the line A-A in FIG. 1.
Figure 8:
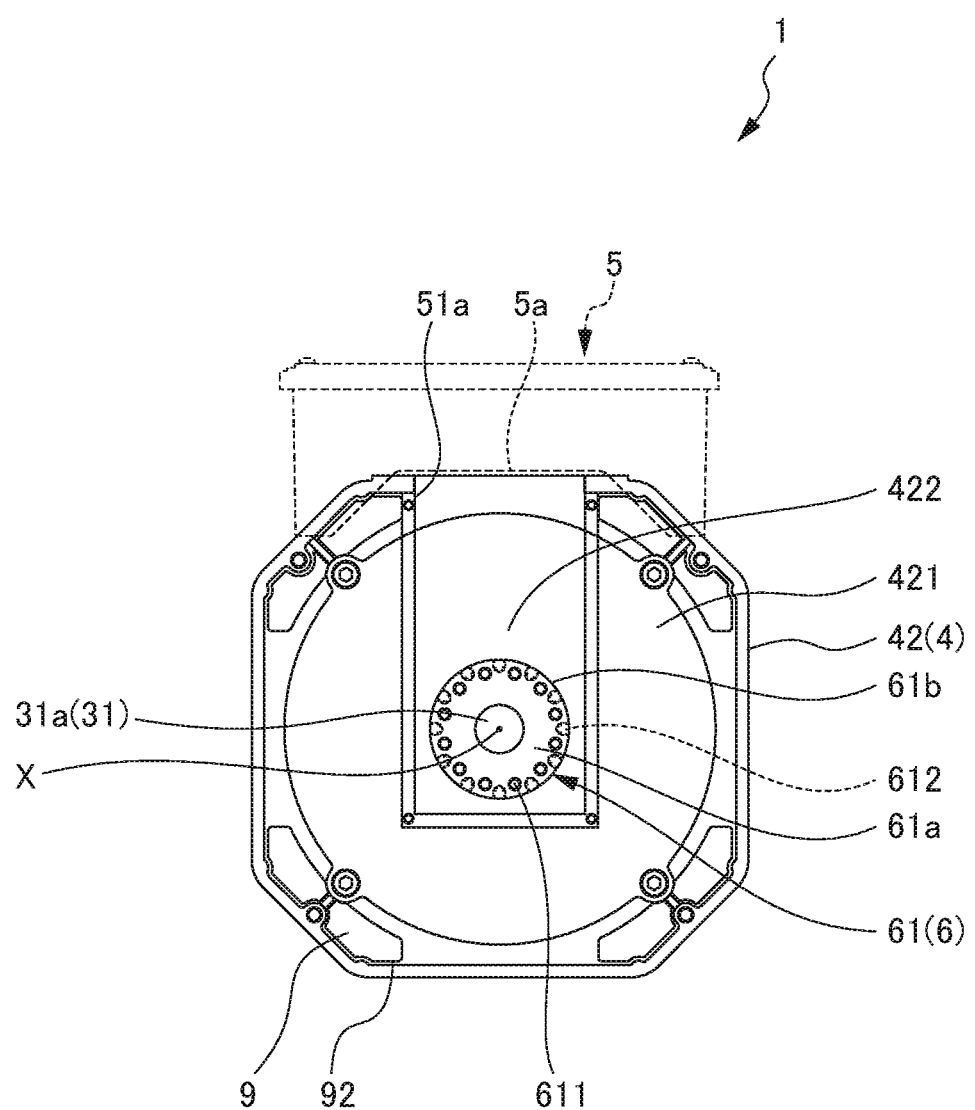
FIG. 8 is a view showing a state removing a cover member in FIG. 7.
Figure 9:
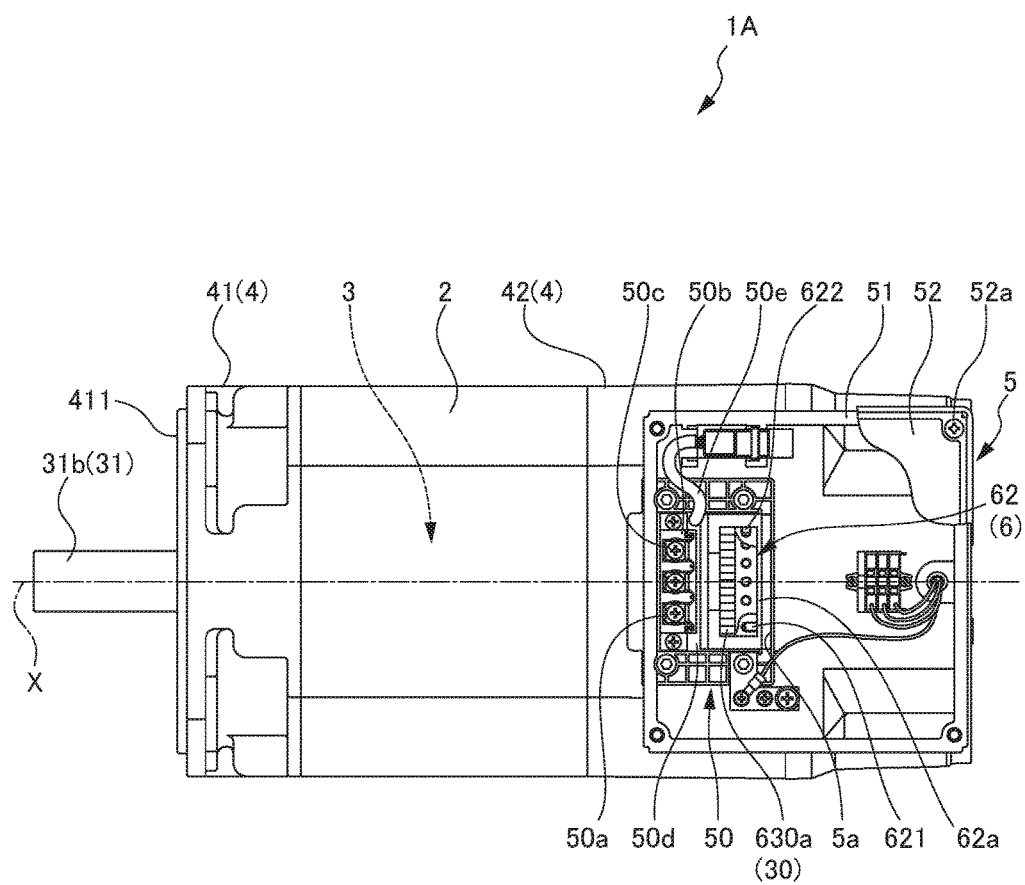
FIG. 9 is a plan view of an electric motor according to a modified example of the present embodiment.
Figure 10:
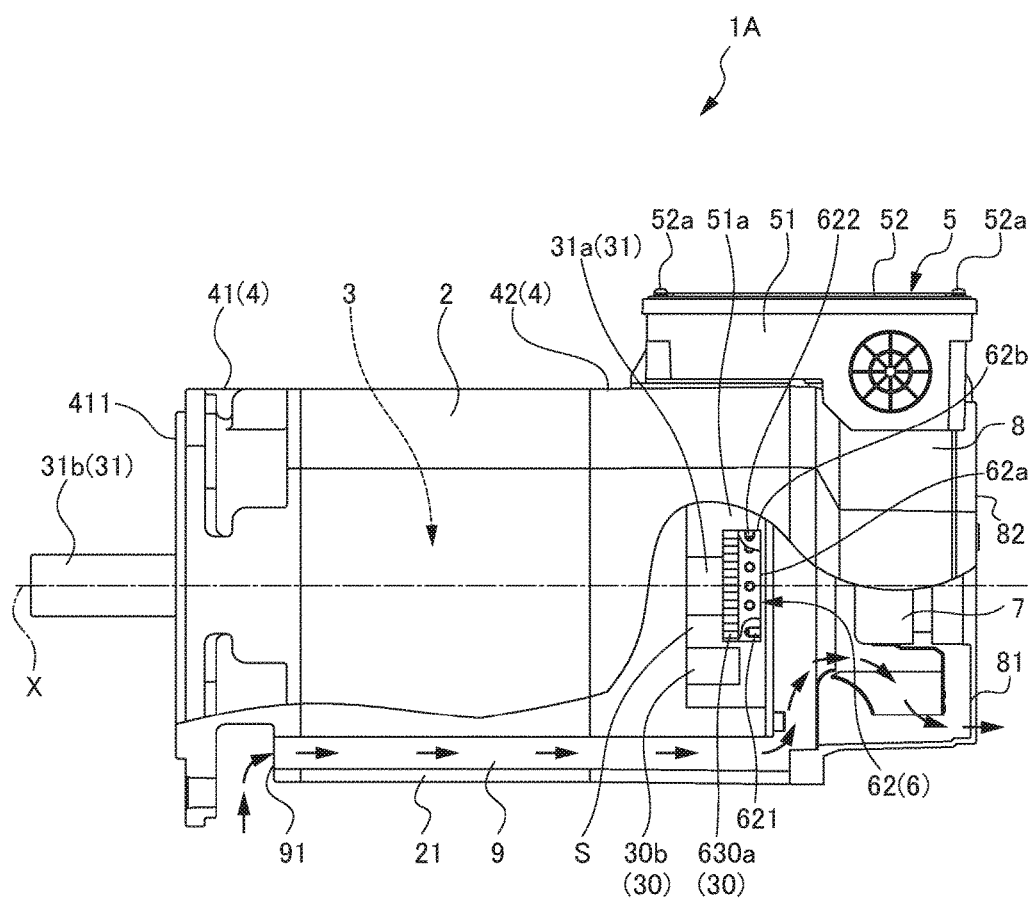
FIG. 10 is a partial cross-sectional side view of the electric motor according to the modified example of the present embodiment.

FIG. 1 is a side view of an electric motor 1 according to the present embodiment. FIG. 2 is a drawing viewing the electric motor 1 according to the present embodiment from forward in the axial direction. FIG. 3 is a drawing viewing the electric motor 1 according to the present embodiment from rearward in the axial direction. FIG. 4 is a plan view of the electric motor 1 according to the present embodiment. FIG. 5 is a partial cross-sectional view of FIG. 1; FIG. 6 is a partial cross-sectional view of FIG. 2; FIG. 7 is a cross-sectional view along the line A-A in FIG. 1; and FIG. 8 is a view showing an aspect of removing a cover member 44 in FIG. 7. In addition, FIG. 9 is a plan view of an electric motor 1A according to a modified example of the present embodiment. FIG. 10 is a partial cross-sectional side view of the electric motor 1A according to the modified example of the present embodiment. FIG. 11 is a partial cross-sectional side view when coupling the electric motor 1 according to the present embodiment with a spindle 11 of a machine tool 10.

Herein, axial direction indicates an axis line X direction of a rotary shaft part 31 of a rotor 3 described later. Forward in the axial direction indicates a side of a spindle mounting face 411 mounted to the spindle 11 of the machine tool 10, and for example, indicates the left side in FIG. 1. In addition, rearward in the axial direction indicates a side of a fan cover 8, and for example, indicates the right side in FIG. 1.

The electric motor 1 according to the present embodiment is an induction electric motor, for example, and has a winding (not illustrated) on a stator 2 described later, has a bare conductor (not illustrated) short-circuited to the rotor 3, and operates by way of the electromagnetic induction effect from the winding to the conductor. This induction electric motor is broadly utilized due to having a simple structure and maintenance also being easy.

As shown in FIGS. 1 to 8, the electric motor 1 according to the present embodiment includes the stator 2, the rotor 3, a housing 4 and a terminal box 5.

The stator 2 has a cylindrical shape, and the rotor 3 described later is rotatably disposed inside thereof (inner side). The stator 2 is configured by a plurality of magnetic steel sheets laminated in the axial direction. A plurality of slots (not illustrated) arranged at equal intervals in the circumferential direction is formed in a peripheral wall part 21 of the stator 2. Each slot is provided to extend in the axial direction of the stator 2, and a winding (not illustrated) is accommodated therein.

The rotor 3 includes a rotor main body (not illustrated) and the rotary shaft part 31. The rotor main body has a columnar shape, and is provided coaxially relative to the rotary shaft part 31, and fixed to this rotary shaft part 31. The short-circuited bare conductor (not illustrated) is disposed to the rotor main body. The rotary shaft part 31 is rotatably provided to the stator 2, and rotates integrally with the rotor main body. The rotary shaft part 31 is configured from a first shaft part 31a constituting an axial-direction rearward portion, and a second shaft part 31b constituting an axial-direction forward portion. The first shaft part 31a is rotatably supported by a back housing 42 described later, and the second shaft part 31b is connected to the spindle 11 of the machine tool 10 (refer to FIG. 11).

At the axial-direction rearward part of the electric motor 1, a rotation detection part 30 that detects the revolution speed of the rotor 3 is provided (refer to FIG. 5). This rotation detection part 30 is configured by a gear-shaped detection rotating element 30a mounted to the first shaft part 31a, and a rotation detector 30b that detects the revolution speed of this detection rotating element 30a.

The housing 4 is installed to both ends in the axial direction of the stator 2, and supports the stator 2. The housing 4 has a front housing 41 installed ahead in the axial direction of the stator 2, and the back housing 42 installed behind in the axial direction of the stator 2.

The housing, i.e. front housing 41 and back housing 42, both have a substantial square tubular shape, and have four main outer peripheral lateral faces. In other words, these housings have two lateral faces (for example, surface parallel to bottom side in FIG. 1), a top surface (for example, upper surface in FIG. 1), and a bottom surface (for example, lower surface in FIG. 1). In addition, these housings have four corners that are chamfered.

The front housing 41 is fixed to a front part in the axial direction of the stator 2. A spindle head 12 of the machine tool 10 described later is connected to the spindle mounting face 411 on the forward side in the axial direction of the front housing 41 (refer to FIG. 11). A labyrinth member 60 of a labyrinth structure is provided to the side of the spindle mounting face 411 of the front housing 41. This labyrinth member 60 prevents oil, etc. in the environmental atmosphere from penetrating inside the electric motor 1. In addition, this labyrinth member 60 has an annular shape, and has a plurality of taps 60b for balance correction formed at equal intervals in the circumferential direction and extending in the axial direction. Although not illustrated, by adjusting the weight, number and arrangement of set screws installed to the taps 60b, balance correction of the electric motor 1 becomes possible.

The back housing 42 is fixed to a rear part in the axial direction of the stator 2. At the end face 421 at a rear side in the axial direction of the back housing 42, the cover member 44 is mounted to be fixed so as to cover the rear side in the axial direction of an opening 5a described later (refer to FIG. 7), and a fan cover 8 accommodating a cooling fan 7 described later is mounted via this cover member 44.

The terminal box 5 is mounted to the back housing 42 and a top face of the fan cover 8 described later. The terminal box 5 accommodates a terminal block 50 inside thereof. The terminal box 5 includes a box part 51 and a cover part 52.

The box part 51 is a box of rectangular shape in a plan view, and the top face thereof is open. The cover part 52 is a plate member of rectangular shape in a plan view, and is arranged so as to cover the opening of the box part 51. This cover part 52 is fixed at the four corners thereof by screws 52a to the top end face of the four side walls of the box part 51. Waterproofing and dust-proofing are thereby secured for the terminal block 50.

The lead wires (not illustrated) of each phase of the windings arranged on the stator 2 are guided into the terminal box 5. Solderless terminals (not illustrated) are installed to the leading end of each lead wire, and are electrically connected to conductive plates 50d by screws 50c. In addition, power cables (not illustrated) are also connected with the joints by the screws 50c to the conductive plates 50d.

In addition, a rectangular opening 5a, for example, is formed in the bottom face of the terminal box 5 as shown in FIG. 4. It should be noted that FIG. 4 shows a part of the cover part 52 in a partial cross-sectional view. This opening 5a is provided so as to open at the interior of the terminal box 5 through the back housing 42. In other words, the opening 5a is provided so as to communicate with an opening 51a provided in the back housing 42, as shown in FIG. 8.

A first balance correction component 61 serving as the balance correction component 6 is arranged at a position exposed at the interior of the terminal box 5 from the opening 5a. In other words, the first balance correction component 61 is exposed within the terminal box 5 from the opening 5a through the opening 51a. These openings 5a, 51a and the first balance correction component 61 will be described in further detail at a later stage.

However, in an induction electric motor such as the electric motor 1 of the present embodiment, the stator 2 and/or rotor 3 generate heat in principle of operation. Therefore, for maintaining performance, the electric motor 1 includes, as the cooling structure, a cooling fan 7, fan cover 8, and ventilation passage 9.

The cooling fan 7 is arranged at a rearward side in the axial direction of the electric motor 1, and is mounted to the back housing 42 (refer to FIG. 5). The cooling fan 7 is a centrifugal-type fan, for example, and generates air flow in the axial direction by rotating by way of the driving of a fan motor (not illustrated).

The fan cover 8 is mounted to the back housing 42, and accommodates the cooling fan 7 inside thereof. A plurality of fan holes 81 enabling the influx of ambient air to the inside and efflux of air from the inside thereof is provided in the fan cover 8. In more detail, the fan holes 81 are formed to be demarcated by a circular central part 83 positioned at the center, a plurality of radial ribs 84 extending radially from the outer circumference of this central part 83, and a plurality of ring-shaped annular ribs 85 of different diameter, in a back end face 82 in the axial direction of the fan cover 8.

The ventilation passage 9 is formed by through holes penetrating in the axial direction in the peripheral wall part 21 of the stator 2 (refer to FIGS. 5 to 8). A plurality of the ventilation passages 9 is formed to be aligned in the circumferential direction in the peripheral wall part 21 of the stator 2. An inlet 91 is formed at a forward side in the axial direction of the ventilation passage 9, and an outlet 92 is formed at a rearward side in the axial direction.

As shown by the arrows in FIG. 5, when the cooling fan 7 rotates by way of driving of the fan motor, airflow generates in the axial direction and ambient air flows in from the inlet 91. The ambient air flowing in circulates inside of the ventilation passage 9 towards rearwards in the axial direction and flows out from the outlet 92, and then is discharged from the fan hole 81 through the inside of the fan cover 8. The stator 2 and/or the rotor 3, via the stator 2, which generate heat from operation of the electric motor 1, thereby become coolable.

Next, the openings 5a, 51a and the balance correction component 6 will be explained in further detail. The opening 5a is provided in a bottom face of the terminal box 5 as mentioned above, and is in communication with the opening 51a provided in the top surface side of the back housing 52. As shown in FIG. 8, the size of the aperture of the opening 5a and the size of the aperture of the opening 51a are both set to be larger than the first balance correction component 61 described later. In other words, the first balance correction component 61 is exposed inside the terminal box 5 through the opening 51a, and by opening (removing) the cover part 52 of the terminal box 5, it becomes possible to visually confirm and access from above the electric motor 1.

In addition, the opening 51a is configured by a recessed part in which the top is open and is formed in an end face 421 on a rearward side in the axial direction of the back housing 42 to be surrounded by a partition wall 422 provided to as to enclose the first balance correction component 61 described later, and the cover member 44 of rectangular shape (refer to FIGS. 7 and 8). The partition wall 422 is formed to extend a predetermined length rearwards in the axial direction, and the first balance correction component 61 described later is accommodated in this recessed part. In other words, the opening 51a and the opening 5a in communication with this opening 51a are separated from both an internal space S of the stator 2, and the ventilation passages 9 formed in the stator 2. The negative influences on the waterproof performance and cooling performance of the electric motor 1 are thereby avoided. However, separation from the internal space S is not essential, and the opening 5a and opening 51a may be in communication with the internal space S of the stator 2.

The first balance correction component 61 serving as the balance correction component 6 is mounted to the first shaft part 31a constituting the axial-direction rearward portion of the rotary shaft part 31. The first balance correction component 61 has a circular disk shape, and is disposed coaxially with the rotary shaft part 31. It should be noted that, in FIG. 1, etc., the first balance correction component 61 is partially shown in the cross-section for convenience.

At the end face 61a at the rearward side in the axial direction of the first balance correction component 61, a plurality of first taps 611 extending in the axial direction is provided at equal intervals in the circumferential direction, and the balance of the rotor 3 is corrected by adjusting the weight, number and arrangement of set screws (not illustrated) installed.

In addition, at the outer peripheral lateral face 61b of the first balance correction component 61, a plurality of second taps 612 extending in the radial direction is provided at equal intervals in the circumferential direction, and the balance of the rotor 3 is corrected by adjusting the weight, number and arrangement of set screws (not illustrated) installed.

The electric motor 1 including the above configuration is balance corrected by conducting the following, for example. First, prior to assembly of the electric motor 1, the weight, number and arrangement of set screws installed to the first taps 611 of the first balance correction component 61 are adjusted to correct the balance of the rotor 3. Next, in a state removing the cover part 52 of the terminal box 5 after assembling the electric motor 1, the weight, number and arrangement of set screws installed to the second taps 612 are adjusted by accessing the first balance correction component 61 from the opening 5a through the opening 51a, to correct the balance of the rotor 3. In addition, even after long-term operating the electric motor 1, the cover part 52 of the terminal box 5 is removed, and it is balance corrected by way of similar operations.

In the electric motor 1 including the above configuration, the configuration of the balance correction component can be modified as shown in FIGS. 9 and 10. The electric motor 1A according to the modified example shown in FIGS. 9 and 10 includes, as the balance correction component 6, the aforementioned first balance correction component 61 and a second balance correction component 62 configured by a detection rotating element 30a constituting a rotation detection part 30 being integrated therewith.

The second balance correction component 62 has a disk shape, and is integrated by being connected with a disk-like detection rotating element 630a constituting the rotation detection part 30. The second balance correction component 62 is the same configuration as the first balance correction component 61, except for being integrated with the detection rotating element 630a. It is thereby possible to reduce the number of components, as well as being able to decrease the dimension in the axial direction of the electric motor 1A.

In other words, with the electric motor 1A, prior to assembly thereof, the weight, number and arrangement of set screws installed in first taps 621 of the second balance correction component 62 are first adjusted to correct the balance of the rotor 3. Next, in a state removing the cover part 52 of the terminal box 5 after assembling the electric motor 1A, the weight, number and arrangement of set screws installed to the second taps 622 are adjusted by accessing the second balance correction component 62 from the opening 5a through the opening 51a, to correct the balance of the rotor 3. In addition, even after long-term operating the electric motor 1A, the cover part 52 of the terminal box 5 is removed, whereby balance correction is possible by way of similar operations.

According to the present embodiment, the following effects are exerted. With the present embodiment, the opening 5a which opens inside of the terminal box 5 through the housing 4 is provided at a position separated from the ventilation passages 9 formed in the stator 2. In addition, the first balance correction component 61 which corrects the balance of the rotor 3 is mounted to the rotary shaft part 31 of the rotor 3, and the first balance correction component 61 is arranged so as to be exposed inside of the terminal box 5 from the opening 5a. It is thereby possible to correct the balance of the electric motor 1 (1A) easily and with high precision by simply removing the cover part 52 of the terminal box 5, without removing the cooling fan 7, fan cover 8, etc., even after assembly of the electric motor 1 (1A) or after operating over a long period. Therefore, it is possible to easily correct the balance again, even in a case of the vibrations having become gradually worse due to long-term operation. In addition, the opening 5a opens inside of the terminal box 5, and is separated from the ventilation passages 9; therefore, it is possible to avoid a decline in the waterproof performance and cooling performance of the electric motor 1 (1A).

It should be noted that the present invention is not to be limited to the above-mentioned embodiment, and that modifications and improvements within a scope that can achieve the objects of the present invention are also included in the present invention. In the aforementioned embodiments, although the shape of the housing is established as a substantially square tubular shape, it is not limited thereto. It may be cylindrical, or may be a polygonal tube shape other than square. The opening is not necessarily larger than the balance correction component, and it is sufficient so long as at least one tap provided to a lateral face of the balance correction component is visible and accessible.

EXPLANATION OF REFERENCE NUMERALS 1, 1A electric motor
2 stator
3 rotor
4 housing
5 terminal box
5a opening
6 balance correction component
9 ventilation passage
10 machine tool
30a, 630a detection rotating element 30a, 630a
31 rotary shaft part
41 front housing (housing)
52 back housing (housing)
61 first balance correction component (balance correction component)
62 second balance correction component (balance correction component)
611, 621 first tap (balance correction part)
612, 622 second tap (balance correction part)

What is claimed is:

1. An electric motor comprising: a cylindrical stator; a rotor having a rotary shaft part inserted inside of the stator; a housing installed to both ends in an axial direction of the stator; a terminal box mounted to the housing and accommodating a terminal block;
   an opening provided so as to open within the terminal box through the housing, and disposed to be separated from a cooling ventilation passage formed in the stator; and
   a balance correction component that is installed to the rotary shaft part, and corrects balance of the rotor,
   wherein the balance correction component is exposed within the terminal box from the opening.

2. The electric motor according to claim 1, wherein the balance correction component includes, at an outer peripheral lateral face thereof, a balance correction part which enables balance correction of the rotor.

3. The electric motor according to claim 1, wherein the balance correction component includes, at an end face in an axial direction thereof, a balance correction part which enables balance correction of the rotor.

4. The electric motor according to claim 1, wherein the balance correction component is configured to be integrated with a detection rotating element that detects a revolution speed of the rotor.

5. The electric motor according to claim 1, wherein the opening is disposed to be separated from an internal space of the stator.

6. A machine tool comprising the electric motor according to claim 1.

* * * * *